United States Patent [19]

Keenan

[11] 4,219,944

[45] Sep. 2, 1980

[54] WALL MOUNTABLE ASTROLOGY SET

[76] Inventor: Joyce A. Keenan, Rte. 1, Box 5, Merkel, Tex. 79536

[21] Appl. No.: 46,930

[22] Filed: Jun. 8, 1979

[51] Int. Cl.³ ............................................. G09B 29/00
[52] U.S. Cl. ...................................................... 35/44
[58] Field of Search .............. 35/44, 43; 273/DIG. 30

[56] References Cited

U.S. PATENT DOCUMENTS

| | | | |
|---|---|---|---|
| 521,725 | 6/1894 | Molesworth | 35/44 |
| 2,219,378 | 10/1940 | Booth | 35/44 |
| 2,549,495 | 4/1951 | Lightfoot et al. | 35/44 |
| 3,223,420 | 12/1965 | Turner | 273/134 |
| 3,680,865 | 8/1972 | Davis | 273/134 AE |
| 3,761,092 | 9/1973 | Shieff | 273/131 AD |
| 3,836,151 | 9/1974 | Bowerman | 273/136 E |
| 3,876,207 | 4/1975 | Jones | 273/135 AD |
| 3,880,429 | 4/1975 | Blumenaus | 273/136 E |
| 3,973,775 | 8/1976 | Bolan et al. | 273/134 AA |
| 3,996,676 | 12/1976 | Bowmen | 35/44 |
| 4,079,945 | 3/1978 | Brass | 273/239 |
| 4,083,564 | 4/1978 | Matsumoto | 273/239 |

Primary Examiner—Kathleen J. Prunner
Attorney, Agent, or Firm—Dennis T. Griggs

[57] ABSTRACT

A wall mountable board having a display surface and an astrology wheel representative of the zodiac delineated on the display surface is disclosed. The astrology wheel is partitioned into multiple zodiac sectors each embodying a house, and each zodiac sector is partitioned into natal, progressed and transit regions. Tokens representative of the signs of the zodiac constellations, the sun, moon and planets which traverse the zodiac, and planetary aspect relationships within the zodiac are provided for casting a horoscope corresponding to planetary positions in relation to the zodiac at a specific date, time and geographical coordinate. The astrology wheel and the tokens are characterized by mutually coacting surface portions which cause the tokens to releasably adhere to the display surface, thereby allowing a natal horoscope to be erected, and also allowing progressed and transit horoscopes to be successively cast in relation to a given natal horoscope without repetitive reconstruction of the natal horoscope.

1 Claim, 8 Drawing Figures

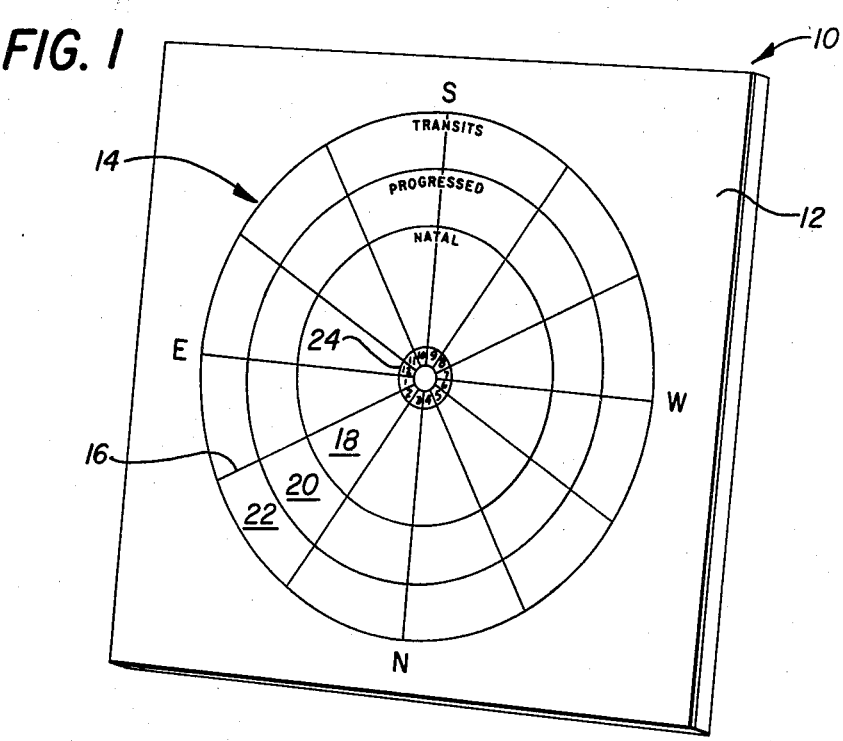

| Symbol | Name |
|---|---|
| ☊ | NORTH NODE |
| ☋ | SOUTH NODE |
| ℞ | RETO GRADE |
| ⊕ | PARS FORTUNE |
| ☆ | SEXTILE |
| □ | SQUARE |
| △ | TRINE |
| ☍ | OPPOSITION |
| ☌ | CONJUNCTION |
| ASC | ASCENDENT |
| MC | MIDHEAVEN |

WALL MOUNTABLE ASTROLOGY SET

BACKGROUND OF THE INVENTION

1. Field of the Invention

The claimed invention relates generally to apparatus for practicing astrological arts and sciences, and in particular to a wall mountable astrology wheel having functional, movable zodiac symbols and planets for daily use by teachers or students of astrology.

2. Description of the Prior Art

According to the traditional practice of astrology, a horoscope is an objective statement of astronomical facts embodied by a map of planetary positions in relation to the zodiac. The zodiac is a band of the sky extending eight degrees on each side of the ecliptic, within which the moon and principal planets remain, and which represents the sun's annual path through the fixed stars. The zodiac traditionally consists of twelve sectors each measuring thirty degrees, with each sector being named after certain fixed star constellations, i.e. Aries, Taurus, Gemini, Cancer, Leo, Virgo, Libra, Scorpio, Sagittarius, Capricorn, Aquarius and Pisces. A horoscope is erected or cast for a specific date and moment of time, and for a given geographical coordinate. The process of casting or erecting the horoscope involves arithmetical calculations which are made with the help of various tables such as an ephemeris which comprises annual tables of planetary motions with details of their respective positions at noon or midnight for every day of the year, a time change table, a latitude longitude table, and a Table of Houses.

The horoscope is a diagram which is conceptually related to the sun rising in the east, i.e. ascending above the eastern horizon at dawn (Ascendant), culminating or reaching its highest point in the heavens at noon (Midheaven), setting in the west in the evening (Descendant) and becoming invisible below the horizon during the night hours (Midnight). The Midheaven is the degree of the zodiac that is culminating at any given minute. During any 24-hour period every one of the 360 degrees of the zodiac successively culminate at the Midheaven. Each Midheaven has its related Ascendant, i.e. the degree of the zodiac simultaneously rising on the eastern celestial horizon. The actual degree will vary slightly within small limits according to the latitude north or south of the equator. Roughly speaking, a new sign rises on the Ascendant every two hours.

The horoscope is usually divided into twelve houses or sectors which are not the same as the zodiac sectors. The boundaries of the first and seventh houses are determined by the Ascendant-Descendant axis, while those of the tenth and fourth houses correspond with the Midheaven-Midnight axis.

In summary, a horoscope erected on the basis of a known time and geographical position contains the following factors:
- twelve 30° zodiac sectors;
- ten planets in their appropriate zodiac positions;
- twelve houses, the boundary of the first being the Ascendant;
- four "angles" (sensitive points): Ascendant, Midheaven, Descendant, and Midnight; and,
- the angular relationship, or aspect, between any two or more planets.

The natal horoscope contains an exact astrological record of a moment of time (time of birth) for a given geographical position (place of birth), and it is expressed symbolically in a code in relation to a certain house assignment which is not founded upon astronomical data but rather upon traditional beliefs and assumptions. The following are commonly accepted beliefs and assumptions which practitioners of traditional astrology observe:

1. That each planet works or operates in a different way, i.e., has a particular personality effect such as martial (Mars), mercurial (Mercury), saturnine (Saturn) and jovial (Jupiter).
2. That a planet in some way reflects the qualities of the zodiac sign with which it is connected.
3. That the effect of a planet will depend upon its house position.
4. That angular relationships temper or enhance the respective influences of any two or more planets.

Traditional natal characterizations of the planets, signs of the zodiac and the twelve houses are given below:

THE PLANETS

Sun: the living being, the physical body.
Moon: the soul or psyche, fantasy and feeling, change and fluctuation.
Mercury: intelligence, reason, associative or connective function.
Mars: action, energy, impulsion, aggressive function.
Jupiter: expansion, richness (material or metaphysical), health, humour.
Saturn: limitation, contraction, concentration, inhibition, separation, maturity, loss.
Uranus: suddenness, revolution, violence, transmutation.
Neptune: susceptibility, fantasy, romanticism.
Pluto: power, demagoguery, metamorphosis.

THE SIGNS OF THE ZODIAC

Aries: courage, impetuosity, energy.
Taurus: patience, persistence, obstinacy.
Gemini: progressiveness, cleverness, instability.
Cancer: inspiration, sensitivity, evasiveness.
Leo: dignity, breadth of mind, pretentiousness.
Virgo: reason, exactitude, pedantry.
Libra: harmony, evaluation, trivialities.
Scorpio: profundity, insistency, roughness.
Sagittarius: justice, propriety, sophistry.
Capricorn: independence, abstraction, stubbornness.
Aquarius: spirituality, conviction, illusion.
Pisces: compassion, tolerance, indolence.

THE TWELVE HOUSES

1. Development of personality, environment, childhood, physical constitution.
2. Material possessions and money.
3. Family relationships, communication.
4. Parental home, hereditary characteristics.
5. Procreation, sexuality, pleasure, speculation.
6. Servants, health.
7. The community, partnership, marriage, open enemies.
8. Accidents, death, inheritances, the wife's or husband's money.
9. Spiritual life, philosophy, religion, travel.
10. Vocation, profession, public life.
11. Wishes and hopes, friendships.
12. Secret enemies, seclusion (hospitals, imprisonments), obscure difficulties.

| THE ASPECTS | | | |
|---|---|---|---|
| Conjunction | 0° | Sesquiquadrate | 135° |
| Opposition | 180° | Trine | 120° |
| Square | 90° | Sextile | 60° |

One popular predictive technique which is based upon the natal horoscope requires the individual factors of a given natal horoscope to be "progressed" in accordance with a mathematical plan, for example a "day for a year" or a "degree for a year". For example, a progressed horoscope for a given time period after a person's birth is made by calculating the number of years elapsed from the date of birth to the given period of interest and consulting the ephemeris for an equal number of days following his date of birth, and thereafter inserting the planetary positions for that progressed day on the chart and investigating the angles formed by the progressed planets in relation to those in his natal horoscope.

Another important predictive method involves the calculation of "transits" in which the current or future positions of the planets are examined and compared with the corresponding positions of the planets in the natal horoscope. During any twenty-four hour period only the moon moves to any appreciable extent and passes into a new zodiac sector after about two and one-half days. Therefore it is sometimes useful to be able to display the changing position of the moon on a daily basis.

It will be appreciated that a simple natal horoscope may be cast with no more than pencil and paper. The horoscope for a certain event at a given time and place is fixed and independent with respect to the nature of the event. However, an unlimited number of progressions or transits may be made with respect to a natal horoscope. Because interpretations of progressions and transits are based upon comparisons of the progressed or transit data with the natal horoscope data, it is important to be able to display progressed data or transit data in combination with the natal horoscope data. According to conventional practice, progressions and transits are made by entering written data on a preprinted astrology chart. The requirement that the data be erased or otherwise deleted, or that the natal chart be reconstructed each time that new data is entered, is burdensome for experienced practitioners of astrology, and limits the rate of development and learning of students.

Therefore, the principal object of the present invention is the provision of an astrology wheel with functional and movable zodiac symbols and planets for use by either experienced practitioners or students of astrology for successively casting, as desired, progressed and transit horoscopes in combination with a natal horoscope which remains relatively fixed.

SUMMARY OF THE INVENTION

According to the invention, progressed and transit horoscopes may be cast and displayed simultaneously with a natal horoscope on a wall mountable board having a display surface and an astrology wheel representative of the zodiac delineated on the display surface. The astrology wheel is partitioned into multiple sectors each embodying a house, and each sector being partitioned into natal, progressed and transit regions. Tokens representative of the signs of the zodiac constellations, the sun, the moon and planets which traverse the zodiac, and planetary aspect relationships within the zodiac are provided for casting a horoscope corresponding to planetary positions in relation to the zodiac at a specific date and time in relation to a given geographical coordinate. The display surface of the astrology wheel and the tokens are characterized by mutually coacting surface portions which cause the tokens to releasably adhere to the display surface, thereby allowing the tokens to be moved from house-to-house and from region-to-region. According to this arrangement, the wall mountable astrology set can be used for erecting a natal horoscope, and can also be used for successively casting a number of progressed or transit horoscopes for a given natal horoscope without repetitive reconstruction of the natal horoscope.

The novel features which characterize the invention are defined by the appended claims. The foregoing and other objects, advantages and features of the invention will hereinafter appear, and for purposes of illustration of the invention, but not of limitation, an exemplary embodiment of the invention is shown in the appended drawing.

BRIEF DESCRIPTION OF THE DRAWING

FIG. 1 is a perspective view of a wall mountable board having an astrology wheel constructed according to the teachings of the invention;

FIG. 2 is a plan view of a set of tokens representative of the signs of the zodiac;

FIG. 3 is a plan view of a set of tokens representative of the sun, moon and planets which traverse the zodiac;

FIG. 4 is a plan view of a set of tokens representative of planetary aspect relationships within the zodiac;

FIG. 5 is a plan view of a set of tokens representative of the numbers 0-9;

DETAILED DESCRIPTION OF A PREFERRED EMBODIMENT

Figure 6:
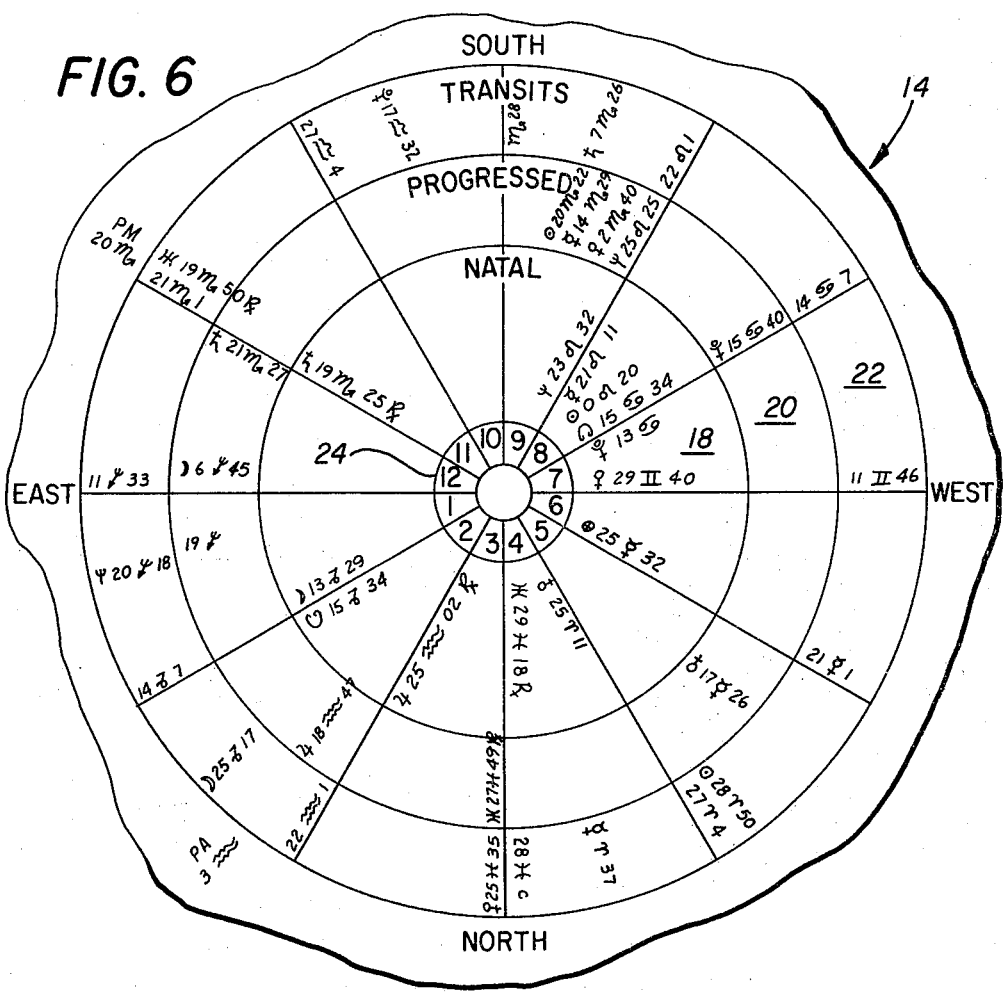
FIG. 6 is a plan view of an astrology wheel constructed according to the teachings of the invention on which natal, progressed and transit horoscopes have been cast.

In the description which follows, like parts are marked throughout the specification and drawing with the same reference numerals, respectively. The drawings are not necessarily to scale and in some instances portions have been exaggerated in order to more clearly depict certain features of the invention.

An astrology board 10 upon which natal, progressed and transit horoscopes may be erected is illustrated FIG. 1. The astrology board 10 is preferably a wall mountable board having a display surface 12 upon which an astrology wheel 14 representative of the zodiac is delineated. The astrology wheel 14 is partitioned into multiple zodiac sectors 16, each measuring 30°. Each zodiac sector 16 is partitioned into a natal region 18, a progressed region 20 and a transit region 22. Each zodiac sector is named after certain fixed star constellations, i.e. Aries, Taurus, Gemini, Cancer, Leo, Virgo, Libra, Scorpio, Sagittarius, Capricorn, Aquarius and Pisces. The natal, progressed and transit regions of all zodiac sectors form concentric rings within the wheel 14. An innermost ring 24 is provided with a corresponding number of cusp spaces for identifying house sectors 1–12.

As previously discussed, the boundaries of the first and seventh houses are determined by the Ascendant-Descendant axis, while those of the tenth and fourth houses correspond with the Midheaven-Midnight axis. It should be realized that the Ascendant axis will not necessarily form a right angle with the Midheaven axis so that the respective areas of the twelve houses will not necessarily be equal, but may vary. However, according to comtemporary practice, for presentation purposes the areas of the houses are portrayed as being exactly equal to each other, and are in angular coincidence with the zodiac sectors, with compensation data indicative of the true Ascendant/Midheaven axes and the true range of each house being entered along the boundary of adjacent sectors. As can be seen in FIGS. 1 and 6, the houses are numbered consecutively in counterclockwise fashion with the Ascendant-Descendant axis forming the boundary for the first and seventh houses, and the Midheaven-Midnight axis forming the boundary for the fourth and tenth houses. As previously discussed above, an ephemeris and other tables is consulted to determine the Ascendant zodiac sign, and it is that sign which is assigned to the zodiac sector for the first house, with the remaining zodiac signs being assigned in counterclockwise fashion to the remaining houses.

According to an important feature of the invention, tokens representative of the signs of the zodiac constellations, the sun, moon and planets which traverse the zodiac, and planetary aspect relationships with the zodiac are provided for erecting or casting a horoscope corresponding to planetary positions in relation to the zodiac at a specific date, time and geographical coordinate. Examples of commonly accepted symbols are illustrated in FIGS. 2, 3, 4 and 5. In FIG. 2, a set of tokens representative of the twelve constellations of the zodiac is illustrated, while in FIG. 3 a set of tokens representative of the sun, moon and planets which traverse the zodiac is illustrated. The set of symbols shown in FIG. 4 are representative of planetary aspect relationships within the zodiac, while the numerals illustrated in FIG. 5 are useful for entering house angular range data on the boundary lines between adjacent zodiac sectors.

According to the teachings of the invention, the astrology board 10 and the tokens are characterized by mutually coacting surface portions which cause the tokens to releasably adhere to the display surface, thereby allowing a natal horoscope to be erected, and also allowing progressed and transit horoscopes to be successively cast in relation to a given natal horoscope without repetitive reconstruction of the natal horoscope. Both the board and each token are preferably constructed of synthetic materials which adhere when pressed together. A commonly available material which is suitable for this purpose is sold under the trademark Velcro.

Figure 7:
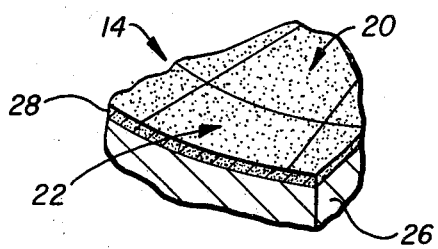
FIG. 7 is an enlarged, fragmentary perspective view of a portion of the astrology wheel shown in FIG. 1; and, FIG. 8 is a perspective view which illustrates the construction of a token having a coactive surface portion for releasably adhering to the astrology wheel shown in FIG. 7.
Figure 8:
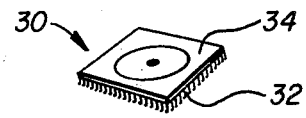

The board construction as illustrated in FIG. 7 comprises a fiberboard foundation 26 onto which a brushed nylon covering 28 is secured. The token 30 illustrated in FIG. 8 is equipped with a hooked nylon layer 32 which is secured to the underside of a vinyl square 34. When the token 30 is pressed against the display surface 12 of the board, the brushed nylon 28 attaches to the hooked nylon 32 and the token 30 is held fast. The token 30 projects slightly above the brushed nylon surface so that it can be easily removed and transferred to a different location as desired.

It will be appreciated that a great many materials may be selected for the board and tokens which have a coacting characteristic which causes adherence of the token to the board. For example, the board may be formed of a magnetizable material, and each token may be equipped with a small magnetic element such as a strip of magnetic tape for securing the token to the metallic board. Alternately, the board may be constructed of cork, and each token may be equipped with a spike or pin for penetrating the cork and thereby holding the token in place. A number of vinyl materials are available which have a characteristic which causes the vinyl surfaces to adhere when placed in direct contact with each other.

The board 10 as well as the individual tokens 30 may be formed of any convenient size or edge contour. However, the tokens should be relatively small with respect to the available area within the zodiac sectors and regions so that six to seven bits of information can be represented by placing the tokens side-by-side as illustrated in FIG. 6. Those skilled in the art and science of astrology will recognize that the illustration of FIG. 6 is representative of natal, progressed and transit horoscopes which are superimposed upon a common astrology wheel. Because the tokens are securely adhered to the display surface, the natal horoscope can be erected and used over and over again as a basis for comparison with progressed and transit horoscopes. On the other hand, since the tokens may be easily removed by lifting, the information which is entered in the progressed and transit regions may be updated as desired without disturbing the previously erected natal horoscope with which it is to be compared. Because the tokens adhere to the display surface, the board can be mounted on a wall and used in a vertical orientation if desired. This is especially useful as an instructional aid when teaching students of astrology. Additionally, the board may be provided with ornamental features and used as a wall decoration in a living area.

Although a preferred embodiment of the invention has been described in detail, it should be understood that various changes, substitutions and alterations can be made therein without departing from the spirit and scope of the invention as defined by the appended claim.

What is claimed is:

1. Apparatus for practicing astrological science comprising, in combination:

a wall mountable board having a display surface and an astrology wheel representative of the zodiac delineated on the display surface, said astrology wheel being partitioned into multiple sectors each embodying a house, and each house being partitioned into natal, progressed and transit regions;

a set of tokens representative of the signs of the zodiac constellations;

a set of tokens representative of the sun, moon and planets which traverse the zodiac;

a set of tokens representative of planetary aspect relationships within the zodiac; and, said display surface and said tokens being characterized by mutually coacting surface portions which cause the tokens to releasably adhere to said display surface.

* * * * *